Feb. 11, 1941.     C. F. BURGESS     2,231,320
DRY CELL
Filed July 10, 1940
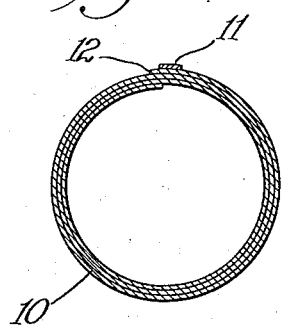
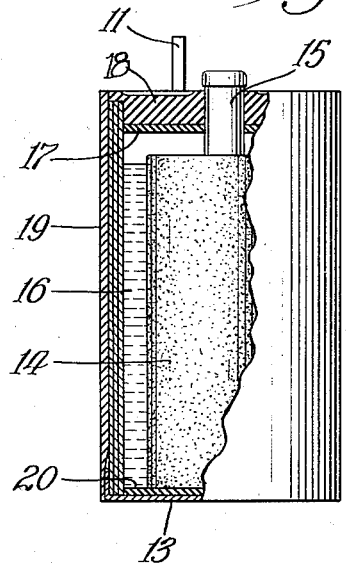
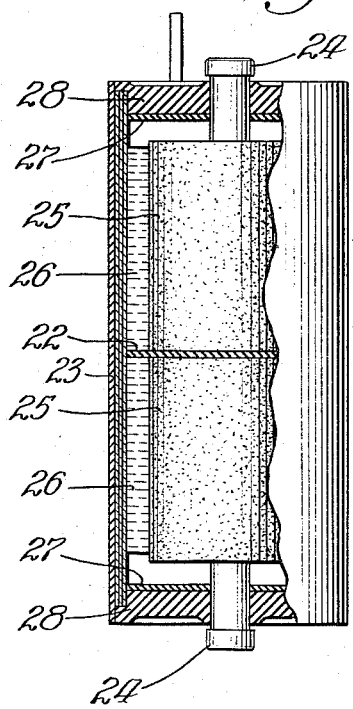
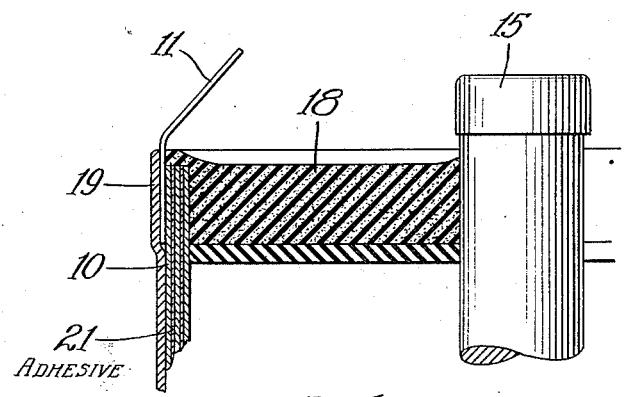
Inventor:
Charles F. Burgess
By: Jesch and Darbo
Attys.

Patented Feb. 11, 1941

2,231,320

UNITED STATES PATENT OFFICE 2,231,320

DRY CELL

Charles F. Burgess, Bokeelia, Fla., assignor to Burgess Battery Company, Chicago, Ill., a corporation of Delaware Application July 10, 1940, Serial No. 344,629

8 Claims. (Cl. 136—112)

This invention relates to a primary cell in which the anode consists of a plurality of layers of metal.

It is an object of this invention to provide a primary cell having improved characteristics over those of a cell employing an electrode comprising a single layer of metal.

It is a specific object of the invention to provide a dry cell of the Leclanche type in which the anode consists of a plurality of thin layers of zinc.

It is a further object of the invention to provide means for protecting a primary cell against excessive initial voltage and against local action.

This invention is illustrated in the accompanying drawing in which:

Fig. 1 is a sectional view of a strip of zinc rolled into a cylindrical tube;

Fig. 2 is a view, partly in section, of a cylindrical dry cell employing a zinc tube such as is illustrated in Fig. 1;

Fig. 3 is an enlarged fragmental sectional view of the dry cell of Fig. 2;

Fig. 4 is a view, partly in section, of a different form of the dry cell employing the multiple layer electrode shown in Fig. 1.

My invention is applicable especially to the production of the cylindrical type of zinc dry cell anode, although it may be applied to the production of the anodes of other forms of dry cells such as those of the flat or plate type and to cells in which the anode is composed of a metal other than zinc, for example, magnesium, iron, aluminum and other suitable metals. It is applicable also to primary cells in which a liquid electrolyte is employed, such as a cell having a zinc anode, a carbon cathode and an electrolyte comprising an aqueous solution of sodium hydroxide. The can, or other form of anode, is made by superimposing a number of layers of thin metal sheets or metal foil, the several layers preferably being attached to each other by means of a suitable adhesive as described hereinafter. A cylindrical can is made by rolling a thin sheet of metal on a cylindrical core or mandril until a tube of the desired wall thickness is obtained and then applying a bottom closure member to one end of the tube. The depolarizing mix, electrolyte paste, carbon rod and seal are then introduced into the can in the usual way.

In the embodiment of this invention shown in Figs. 1 and 2, a thin zinc sheet or foil 10 is rolled upon itself to form a tube, the walls of which are thus made to consist of a plurality of layers of zinc. While three layers are shown in the drawing, any number of layers may be used as desired. A cell having two layers of zinc with one intervening layer of adhesive has been found in practice to give satisfactory results. A terminal lead 11 is soldered to the outer layer. The end edge 12 of the sheet 10 may be attached to the adjacent metal surfaces by solder, but preferably by a lacquer cement, or a thermoplastic resin which on heating and cooling forms a tight and waterproof joint. The bottom end of the tube is closed by a zinc cap 13 which may be flanged as shown so as to fit tightly upon the end of the tube. The joint is made water-tight by solder or resin or any other suitable material. As an alternative, the end cap 13 may be of paper or other suitable material, coated with paraffin or other water and zinc chloride-resisting substance, or it may be composed of a fusible sealing compound such as is usually used for the top closures of cells. After the can is thus formed, the active ingredients, such as the depolarizing core 14, the carbon electrode 15, the electrolyte paste 16, the top washer 17 and the top closure 18, are inserted in the usual way and a tube 19 of paper or other electrical insulating material may be fitted over the zinc tube. The paper tube 19 extends above the top of the zinc tube and the top seal covers the end of the zinc tube as shown.

If a bottom closure of zinc is used, a layer of paper or other electrical insulating material 20 impregnated with paraffin or other suitable water and zinc chloride resisting substance, is interposed between the bottom end closure and the bottom of the depolarizing core.

In the preferred embodiment of this invention, a film of thermoplastic resin is arranged between the superimposed layers of zinc. The resin is applied to a portion of the surface of the zinc sheet such that when the sheet is rolled into an approximately cylindrical tube, the film of thermoplastic resin lies between the entire superimposed areas of the successive layers of zinc and leaves exposed the interior surface of the tube. Upon applying heat such that the resin becomes plastic and sticky, and then cooling, the layers of zinc adhere together and form a rigid, water-tight tube. The layers are separated from one another by the film of resin, and this separation provides important advantages as will be pointed out hereinafter, while, at the same time, the film permits the electrolyte to have access to the succeeding layers of zinc as the dry cell becomes discharged in use.

A polymerized vinyl acetate resin is the preferred material. The resin varies in viscosity depending upon the degree of polymerization to which it has been subjected. Any of the commercially available viscosities of 2.5 to 60 centipoises, (standard viscosities as specified by Shawinigan Chemical, Ltd.) may be used. It is a thermoplastic, adhesive resin, which is normally non-conductive. However, a thin film of this substance, when exposed to the electrolyte, is slightly permeable to the electrolyte solution and when the external circuit is closed, the film becomes dissolved, disintegrated, decomposed or otherwise affected so that it permits the ready flow of current. The character of the action by the electrolyte is not understood but the film is affected in such a way that sufficient current is permitted to flow to render the cell operative for all types of service.

The thickness of the film is not critical. It should not be so thick as to hinder the functioning of the cell as described herein. In general, the thickness may be greater with the resins of lower viscosity. With a resin of 7.0 centipoises viscosity, a film thickness conforming to 25 milligrams of resin per square inch of electrode surface is suitable. The resin is applied while hot and plastic, or by making a dilute solution thereof in a suitable solvent, such as acetone, and applying the solution to the zinc surface. The solvent evaporates, leaving the thermoplastic resin coating on the zinc. The coated sheet is heated while the tube is being formed to soften the resin. It is then allowed to cool and the resin solidifies and forms an adhesive of high strength. A plasticizer may be mixed with the resin to impart a tackiness to it at ordinary temperatures. A common lacquer plasticizer, such as liquid tricresylphosphate, is suitable. The adhesive separating layer is shown at 21 in Fig. 3.

Other materials than thermoplastic resin may be used between the superimposed layers of zinc. The material should be of such composition that it is permeable to the electrolyte, or is dissolved by the electrolyte, or otherwise affected, to afford access of the electrolyte to the succeeding layers of zinc as the dry cell becomes discharged. The action should occur with sufficient promptness so that the galvanic action of the battery is not interfered with by the separating material. Other suitable adhesives are hide glue and boiled starch adhesive. Regenerated cellulose may be used and other materials having a cellulose base, or containing cellulosic ingredients. Such materials are destroyed by strong zinc chloride solutions.

The local couples which develop in dry cells having the ordinary soldered, extruded or drawn zinc cans are largely eliminated by the use of my improved multiple-layer can. This is because the strains and other non-uniformities, which are commonly caused by the forming operations and the use of hot solder, are avoided. In addition, any non-uniformities, which may be present, do not extend through the entire thickness of the can wall but only through the thickness of one layer. As a result, dry cells employing the multiple layer electrodes of this invention are relatively free from objectionable perforation of the can by local action. The properties of the battery and especially the storage or "shelf" life, are improved as a consequence. When the cell is placed into action by the delivery of current, the inner layer of zinc is attacked first and is corroded until it is substantially consumed. The adjacent layer of separating material is then exposed and is dissolved, decomposed, or otherwise affected by the electrolyte, as described heretofore.

During the electrolytic corrosion of the inner zinc layer, a quantity of zinc chloride is formed at the surface of the zinc layer and goes into solution in the aqueous electrolyte. The separating materials, which are permeable to zinc chloride solution, are softened and made more conductive by such solution when they become exposed thereto. All of the adhesive separating materials described herein are affected by the electrolyte in the presence of electrolytic action in such a way that the succeeding layers of zinc are progressively made accessible to the electrolyte and the galvanic action of the dry cell proceeds in a regular and uniform manner until the layers of zinc are substantially consumed. Any local action which may have started is confined to the layer in which it occurs and there are no deep pits or perforations through the can, such as are commonly formed in the ordinary zinc can.

In a different embodiment of the invention, that portion of the zinc which will be exposed to the electrolyte, that is, the inner layer, is amalgamated by applying a solution containing mercury to the clean zinc surface. The mercury is applied only where it is needed, resulting in an efficient and economical use of the mercury, which, under ordinary methods of construction, is distributed throughout the entire thickness of the zinc can. The described multiple layer construction prevents the mercury from getting upon the outer layer or layers or zinc, and a relatively large proportion of mercury to zinc may be used without encountering the structural weakness which results when the ordinary zinc can is amalgamated with relatively large amounts of mercury.

In a further embodiment of the invention, the adhesive separating material may be applied to the entire surface of the zinc sheet whereby a film of the material is provided upon the interior surface of the zinc tube. The film, being permeable to the electrolyte to a restricted degree, permits only a slow diffusion of ions therethrough during the storage period, with the result that the local action which often causes pits and perforations in the zinc can, is decreased and the dry cell is protected. There is sufficient permeability, however, to permit the production of electrical energy when the dry cell is placed in use. With the flow of current, a reaction takes place upon the film, which, as described heretofore, affects the film in such a manner as to permit sufficient current to flow to render the cell operative.

The voltage of a new dry cell is relatively high when it is initially placed in use. The lamps of flashlights sometimes burn out during this initial high-voltage period. The protective interior coating described heretofore prevents the high current caused by the high initial voltage. In fact, the initial current may be slightly lower than the normal. It reaches normal, however, after a short period of use. The protective coating of this invention has the advantage that it is affected so as to permit the flow of current by the action of the dry cell which takes place when the dry cell is placed in use. This insures that the protection will continue throughout the storage period. This interior protective coating may be applied to any type of dry cell can and is not limited to a multiple layer can.

The multiple layer zinc tube of this invention may be used for making a double-ended dry cell. Such a dry cell is illustrated in Fig. 4. A suitable separator 22 may be inserted across the middle of a relatively long multiple layer zinc tube 23, thereby providing two zinc cups in end-to-end relation in the same structure. The active components of the cell comprising the carbon rods 24, depolarizing masses 25, electrolyte 26, insulating washers 27, and closures 28 are assembled in the usual way in these cups.

Advantages of this construction, in addition to those mentioned heretofore, are that the performance characteristics are more uniform throughout the life of the battery, the zinc of the zinc can is used efficiently and is consumed completely in the production of electric energy, a purer and softer grade of zinc may be employed than is feasible where drawn cans are used, and there is a complete utilization of zinc in the making of the cans, no scrap zinc being produced as in the drawing of zinc cups. It also is obvious that this type of construction lends itself well to the production of tubes of circular, square, rectangular, oval or other form, and of any desired length.

This application is a continuation in part of my copending application, Serial No. 102,530, filed September 25, 1936.

I claim:

1. In a primary cell, an electrode comprising a plurality of superimposed layers of sheet metal, said layers being electrically connected together and being separated from each other by a thin layer of material which is normally non-conductive and at most only slightly permeable to the electrolyte of said cell in the absence of electrolytic action, and which is affected by the electrolyte of said cell in the presence of electrolytic action to permit the passage of sufficient current to render said cell operative.

2. In a primary cell, an electrode comprising a plurality of superimposed layers of sheet zinc, said layers being electrically connected together and being separated from each other by a thin layer of material which is normally non-conductive and at most only slightly permeable to the electrolyte of said cell in the absence of electrolytic action, and which is affected by the electrolyte of said cell in the presence of electrolytic action to permit the passage of sufficient current to render said cell operative.

3. In a dry cell of the Leclanche type, an electrode comprising a plurality of layers of sheet zinc said layers being electrically connected together and united by an adhesive which is normally non-conductive and at most only slightly permeable to the electrolyte of said cell in the absence of electrolytic action, and which is affected by the electrolyte of said cell in the presence of electrolytic action to permit the passage of sufficient current to render said cell operative.

4. In a dry cell of the cylindrical type, a zinc can having the circular wall thereof comprising a plurality of superimposed layers of sheet zinc, said layers being electrically connected together and adjacent layers being separated from each other by a layer of material which is normally non-conductive and at most only slightly permeable to the electrolyte of said cell in the absence of electrolytic action, and which is affected by the electrolyte of said cell in the presence of electrolytic action to permit the passage of sufficient current to render said cell operative, the inner layer of zinc being amalgamated.

5. In a primary cell, an electrode comprising a plurality of superimposed layers of sheet metal, said layers being electrically connected together and separated from each other by a thin layer of an adhesive from the group consisting of vinyl acetate resin, hide glue, boiled starch adhesive, regenerated cellulose, and adhesive substances having a cellulose base.

6. In a dry cell, an electrode comprising a plurality of electrically connected superimposed layers of sheet zinc, and other layers between said zinc layers and upon the interior surface of the inner zinc layer, said second layers comprising a thin film of a normally non-conductive, adhesive substance, said substance being at most only slightly permeable to the electrolyte of said cell in the absence of electrolytic action, and being affected by the electrolyte of said cell in the presence of electrolytic action to permit the passage of sufficient current to render said cell operative.

7. In a dry cell, an electrode comprising a plurality of superimposed layers of sheet zinc, said layers being separated from one another by a thin layer of vinyl acetate resin.

8. In a dry cell, an electrode comprising a plurality of superimposed layers of sheet zinc, said layers being separated from one another by a thin layer comprising vinyl acetate resin and a plasticizer.

CHARLES F. BURGESS.